R. PATTERSON.
Improvement in Games.

No. 129,983.                                    Patented July 30, 1872.

| Tenn: | Ind: | Kan: | Del: |
|---|---|---|---|
| A | G | N | T |
| B | H | O | U |
| C | I | P | V |
| D | K | Q | W |
| E | L | R | X |
| F | M | S | Y |

| Goose | Duck | Crow | Eagle |
|---|---|---|---|
| a | g | n | t |
| b | h | o | u |
| c | i | p | v |
| d | k | q | w |
| e | l | r | x |
| f | m | s | y |

(A x / o) B (E m / 3)

(K b / 14) B (L v / 9)

Witnesses:
John Becker
N. A. Graham

Inventor:
R. Patterson
per
Attorneys.

UNITED STATES PATENT OFFICE.

ROBERT PATTERSON, OF NEW SANTA FÉ, MISSOURI.

IMPROVEMENT IN GAMES.

Specification forming part of Letters Patent No. 129,983, dated July 30, 1872.

Specification describing a new and Improved Instructive Game, invented by ROBERT PATTERSON, of New Santa Fé, in the county of Jackson and State of Missouri.

This invention relates to a new alphabetical game to be used by children with the object of becoming fully acquainted with the appearance and the differences of letters and numerals. The invention consists in the use of printed tables containing rows of letters or figures and in the employment of cards or small disks containing similar letters and figures, but singly, so that such disks or cards may be used, as in the game of "Children's Lottery," to cover the places on the printed tables.

In the accompanying drawing, A A are a series of rows of printed tables, each row containing a suitable number of capitals, small letters, or numerals in suitable shape. B B are cards, each marked with one capital, one small letter, and one figure, so that it can be used on each kind of printed table, or each card marked with but one letter or figure, if desired. These cards can be made of ivory, bone, wood, or other material.

In order to increase the interest of the game every row on the tables A may be surmounted by a picture or name of an article, person, or other subject. Every player may choose one or more rows, being guided in his choice by the names or illustrations on top, and covers with a card each letter or figure to which such card corresponds, the one whose entire row is first covered being the winner. By this means close attention to the forms and names of the several letters and characters is insured and the object in question attained.

Having thus described my invention, I claim as new and desire to secure by Letters Patent—

The game composed of the tables A and cards B, substantially as set forth.

ROBERT PATTERSON.

Witnesses:
ROBERT L. YEAGER,
G. E. WICKERT.